United States Patent
Liberale et al.

(10) Patent No.: US 11,796,734 B2
(45) Date of Patent: Oct. 24, 2023

(54) 3D PRINTED WAVEGUIDES AND METHOD BASED ON PHOTONIC CRYSTAL FIBERS

(71) Applicant: KING ABDULLAH UNIVERSITY OF SCIENCE AND TECHNOLOGY, Thuwal (SA)

(72) Inventors: Carlo Liberale, Thuwal (SA); Andrea Bertoncini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/574,107

(22) Filed: Jan. 12, 2022

(65) Prior Publication Data

US 2022/0221645 A1 Jul. 14, 2022

Related U.S. Application Data

(60) Provisional application No. 63/137,427, filed on Jan. 14, 2021.

(51) Int. Cl.
| | | |
|---|---|---|
| G02B 6/02 | (2006.01) |
| G02B 6/27 | (2006.01) |
| G02B 6/036 | (2006.01) |
| G02B 6/36 | (2006.01) |

(52) U.S. Cl.
CPC ..... *G02B 6/03616* (2013.01); *G02B 6/02338* (2013.01); *G02B 6/3684* (2013.01); *G02B 6/274* (2013.01)

(58) Field of Classification Search
CPC G02B 6/02338; G02B 6/274; G02B 6/02323; G02B 6/02333; G02B 6/02347; G02B 6/02361; G02B 6/02376
See application file for complete search history.

(56) References Cited

FOREIGN PATENT DOCUMENTS

WO WO-2016137344 A1 * 9/2016 ......... G02B 6/02042

OTHER PUBLICATIONS

Bertoncini, A., et al., "On-Fiber 3D Printing of Photonic Crystal Fiber Tapers for Mode Field Diameter Conversion," 017 Conference on Lasers and Electro-Optics Europe & European Quantum Electronics Conference (CLEO/Europe-QEC, Jun. 25-29, 2017, paper CE_6_2, Optical Society of America (Year: 2017).*

(Continued)

*Primary Examiner* — Omar R Rojas
(74) *Attorney, Agent, or Firm* — PATENT PORTFOLIO BUILDERS PLLC

(57) ABSTRACT

An optical waveguide is configured to guide an optical beam, and the optical waveguide includes a down-taper element configured to reduce a diameter of an incoming light beam having a random polarization; a dual-core directional coupler element configured to separate the incoming light beam into a horizontally-polarized beam and a vertically-polarized beam, each beam being confined in first and second cores, respectively; and a core fan-out element configured to increase a distance between the horizontally-polarized beam and the vertically-polarized beam upon exit from the core fan-out element. Each of the down-taper element, the dual-core directional coupler element, and the core fan-out element are 3-dimensional, 3D, printed using a single material.

19 Claims, 15 Drawing Sheets

(56) References Cited

OTHER PUBLICATIONS

Kubota, H., et al., "Absolutely Single Polarization Photonic Crystal Fiber," IEEE Photonics Technology Letters, Jan. 2004, vol. 16, No. 1, pp. 182-184, IEEE.

Wei, H., et al., "Two-Photon Direct Laser Writing of Inverse-Designed Free-Form Near-Infrared Polarization Beamsplitter," Advanced Optical Materials, Aug. 2019, vol. 7, No. 900513, pp. 1-5, WILEY-VCH Verlag GmbH & Co.

Beravat, R., et al., "Twist-Induced Guidance in Coreless Photonic Crystal Tiber: A Helical Channel for Light," Science Advances, Nov. 25, 2016, vol. 2, e1601421, pp. 1-5.

Bertoncini, A., et al., "On-Fiber 3D Printing of Photonic Crystal Fiber Tapers for Mode Field Diameter Conversion," 2017 Conference on Lasers and Electro-Optics Europe & European Quantum Electronics Conference (CLEO/Europe-EQEC, Jun. 25-29, 2017, paper CE_6_2, Optical Society of America.

Cook, K., et al., "Air-Structured Optical Fiber Drawn from a 3D-Printed Preform," Optics Letters, Sep. 2015, vol. 40, pp. 3966-3969, Optics Society of America.

Debord, B., et al., "Hollow-Core Fiber Technology: The Rising of 'Bas Photonics'," Fibers, Feb. 18, 2019, vol. 7, No. 16, pp. 1-58.

Gan, Z., et al., "Three-Dimensional Deep Sub-Diffraction Optical Beam Lithography with 9 nm Feature Size," Nature Communications, Jun. 19, 2013, vol. 4, 2061, pp. 1-7, Macmillan Publishers Limited.

Hahn, V., et al., "Polarizing Beam Splitter Integrated onto an Optical Fiber Facet," Optics Express, Dec. 4, 2018, vol. 26, No. 25, pp. 33148-33157.

Jiang, H., et al., "Polarization Splitter Based on Dual-Core Photonic Crystal Fiber," Optics Express, Dec. 1, 2014, vol. 22, No. 25, pp. 30461-30466.

Leon-Saval, S.G., et al., "Supercontinuum Generation in Submicron Fibre Waveguides," Optics Express, Jun. 26, 2004, vol. 12, No. 13, pp. 2864-2869.

Talataisong, W., et al., "Mid-IR Hollow-Core Microstructured Fiber Drawn from a 3D Printed PETG Preform," Scientific Reports, May 25, 2018, vol. 8, 8113, pp. 1-8, Springer Nature.

Tandjé, A., et al., "Ring-Core Photonic Crystal Fiber for Propagation of OAM Modes," Optics Letters, Mar. 21, 2019, vol. 44, No. 7, pp. 1611-1614, Optics Society of America.

Van Putten, Lieke D., "Design and Fabrication of Novel Polymer Antiresonant Waveguides," Ph.D. Thesis, University of Southampton, Feb. 2019.

* cited by examiner

ND METHOD
3D PRINTED WAVEGUIDES AND METHOD BASED ON PHOTONIC CRYSTAL FIBERS

CROSS-REFERENCE TO RELATED APPLICATIONS

This application claims priority to U.S. Provisional Patent Application No. 63/137,427, filed on Jan. 14, 2021, entitled "3D PRINTED WAVEGUIDES BASED ON PHOTONIC CRYSTAL FIBER DESIGNS FOR COMPLEX FIBER-END PHOTONIC DEVICES," the disclosure of which is incorporated herein by reference in its entirety.

BACKGROUND

Technical Field

Embodiments of the subject matter disclosed herein generally relate to optical waveguide segments based on geometrically unbound photonic crystal fibers, and more particularly, to 3D printing optical waveguide segments, or a combination of such segments, to obtain miniaturized complex devices that implement advanced photonic operations.

Discussion of the Background

Photonic crystal fibers (PCFs), also known as microstructured optical fibers or holey fibers, are single-material optical fibers in which an array of microscopic longitudinal hollow channels are made to enable light guidance. The design of the geometry of the longitudinal hollow channels in PCFs is a powerful tool for controlling and tuning the fiber waveguide parameters, such as optical mode size and shape, modal dispersion, birefringence, and nonlinearity. With the development of PCFs, unprecedented fine control of the fiber waveguide parameters across a wider range has become achievable, opening up unique possibilities like supercontinuum generation, fiber chromatic dispersion engineering, and ultrahigh birefringence. Furthermore, PCFs are unique in allowing the creation of hollow-core fibers, which have important applications such as fiber propagation with ultralow nonlinearity or novel gas and optofluidic sensors.

Optical waveguides based on PCF designs could be exploited on the small scale as building blocks to create on-fiber complex miniaturized devices that implement advanced photonic operations including, but not limited to, mode conversion, Y-splitting, and polarization splitting. For such devices, the accurate and geometrically unbound manufacture of the designed PCF transverse hole patterns is of paramount importance. Additionally, precise control of the longitudinal variation of the PCF geometry allows the creation of elements such as ultrashort adiabatic tapers or periodic structures, which will pave the way for the development of novel miniaturized photonic devices.

As an example of a PCF segment, element 100 is shown in FIG. 1 having a core 102 through which the light is guided. The core 102 is surrounded by a cladding 104. Different from the traditional optical fiber where the cladding is just a selected material, different from the core material, the cladding 104 includes, in addition to the selected material, plural holes/channels 106 that extend along the core 102, but at a distance from the core. These plural holes 106 form a lattice and due to their diameter d, and the distance between them A, also called the lattice spacing, confine the propagating light inside the core 102. The PCF 100 may also have an air cladding 108, distributed around the plural holes 106. The air cladding 108 is a set of tubes that are filled with air. This air cladding is used to create a guiding region in the cladding 104, to obtain the so-called double clad PCF. Finally, the PCF is covered with a protective coating 110.

However, current PCF fabrication methods have important limitations in manufacturing PCF segments 100 with the desired characteristics. In addition, optically connecting the various PCF segments 100 to each other to create complex miniaturized photonic systems is problematic with the existing methods. This is so because the PCF segments are primarily fabricated by drawing a cylindrical "preform" of cm-scale diameter. Essentially this method takes the preform, i.e., a segment that has a large scale so that the desired channels can be made, and stretch the preform to reduce its diameter to the desired diameter of the PCF segments, which might be in the mm scale. In other words, the preform has a cross-sectional geometry that corresponds to a scaled-up version of the desired final sub-mm-scale geometry of the PCF segment.

The current method for creating the preform, however, offer only limited freedom in the design of the preform. Additionally, during the drawing process, the preform geometry is generally not preserved due to material viscosity, gravity, and surface tension effects. Therefore, obtaining the desired PCF cross-sectional structure is not a straightforward process, and can be especially difficult. Specific hole geometries are even impossible to realize [1]. The 3D printing of cm-scale PCF preforms has been recently proposed as a means to increase the freedom of design, but the perturbing effects of drawing still present a major limiting factor that prevents the accurate realization of arbitrary PCF designs [2-4]. Lastly, μm-scale control of the length of the PCF segments and of their longitudinal tapering, which is needed to create miniaturized photonic systems, is very difficult with the existing preform-based methods.

Thus, there is a need for a new method and corresponding PCF segments that can be manufactured at a small scale with intricate empty channels to achieve the desired optical properties, without being mechanically limited by the used process.

BRIEF SUMMARY OF THE INVENTION

According to an embodiment, there is an optical waveguide configured to guide an optical beam. The optical waveguide includes a down-taper element configured to reduce a diameter of an incoming light beam having a random polarization, a dual-core directional coupler element configured to separate the incoming light beam into a horizontally-polarized beam and a vertically-polarized beam, each beam being confined in first and second cores, respectively, and a core fan-out element configured to increase a distance between the horizontally-polarized beam and the vertically-polarized beam upon exit from the core fan-out element. Each of the down-taper element, the dual-core directional coupler element, and the core fan-out element are 3-dimensional, 3D, printed using a single material.

According to another embodiment, there is an optical waveguide that includes a body extending along a longitudinal axis X, a core located inside the body and extending along the longitudinal axis X, and plural channels formed in the body, around the core, and configured to confine a light beam into the core. An internal surface of the plural channels has a surface roughness larger than 10 nm as the plural channels are 3D printed.

According to yet another embodiment, there is a method for making an optical waveguide configured to guide an optical beam, the method including printing a down-taper element directly on a face of an optical fiber, wherein the down-taper element is configured to reduce a diameter of an incoming light beam having a random polarization, printing a dual-core directional coupler element directly on the down-taper element, wherein the dual-core directional coupler element is configured to separate the incoming light beam into a horizontally-polarized beam and a vertically-polarized beam, each beam being confined in first and second cores, respectively, and printing a core fan-out element directly onto the dual-core directional coupler element, the core fan-out element being configured to increase a distance between the horizontally-polarized beam and the vertically-polarized beam upon exit from the core fan-out element. Each of the down-taper element, the dual-core directional coupler element, and the core fan-out element are 3-dimensional, 3D, printed using a single material.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
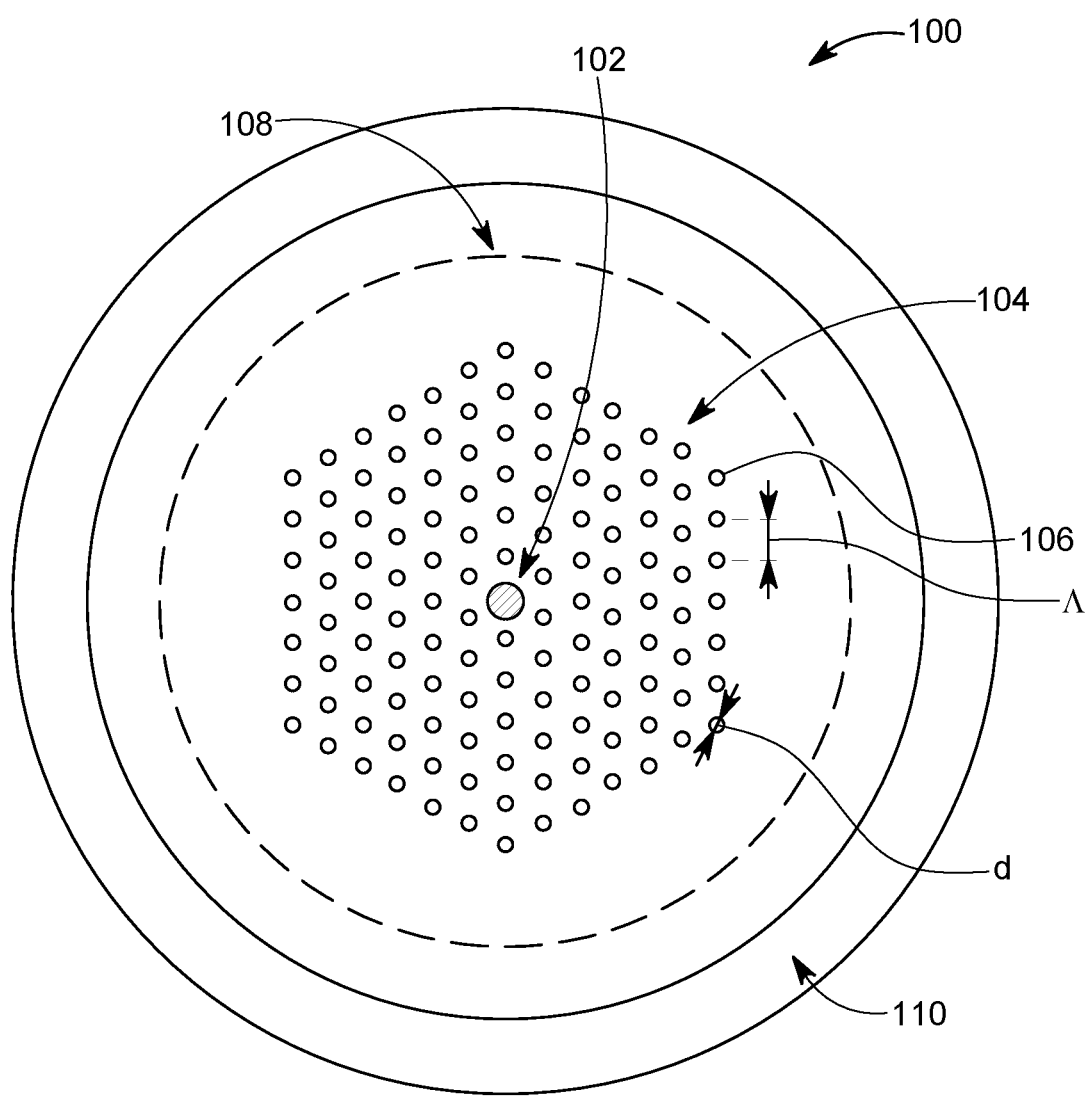
FIG. 1 is a schematic diagram of photonic crystal fibers configured to confine light inside a core.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a polarization beam splitter PCF segment. However, the embodiments to be discussed next are not limited to such a PCF segment, but may be used to any PCF segment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a PCF segment is 3D printed, for example, directly on the face of a traditional optical fiber. No drawing step is involved in this process, which makes the manufactured device to have exact dimensions and shapes. Also, the 3D printing method allows the manufacturing of any type, shape, and size of PCF segments. This process allows for in situ single-step fabrication of stacked ultrashort PCF-like segments with different geometries to create all-fiber integrated devices that perform complex optical operations in sub-mm lengths. This approach entirely avoids the drawing process that introduces so many limitations and drawbacks, and offers unprecedented design flexibility and precision in the control of the transverse and longitudinal PCF geometry.

The high-resolution 3D printing process can precisely replicate the hole array geometry for virtually any class of manufactured PCF designs known in the art. The method is now discussed with regard to FIG. 2. Note that the same method can be applied to any PCF segment. In this embodiment, a 3D printing through two-photon lithography offers sub-µm resolution [5], 3D design freedom, and has been recently exploited in several fields, including micro-optics. In two-photon lithography, a focused near-infrared femtosecond laser beam induces the highly localized polymerization of a photopolymer. The photopolymer used in this embodiment is the IP-Dip photopolymer (Nanoscribe GmbH). This photopolymer provides the highest fabrication resolution among those available from this manufacturer. This photoresist is mainly composed of pentaerythritol triacrylate. The method uses this resist with a 63×1.4 NA microscope objective in a dip-in lithography configuration, in which the microscope objective is directly dipped into the photoresist.

For the selected printing configuration, a polymerized voxel has an ellipsoidal shape, with a typical size of about 0.3 µm×1 µm. The writing laser may be a near-infrared femtosecond fiber laser with a pulse duration of about 100 fs, a 780 nm wavelength, and a 80 MHz repetition rate. The system may use galvanometric mirrors for beam steering in the system, which allows a high linear writing speed up to 100 mm/s. The 3D printing process starts in step 200, by providing an optical fiber. Then, the printing is executed in step 202 layer by layer, directly on a face of the optical fiber, with the transverse (x–y) scanning performed by the galvo system while the axial (z) movement is carried out by a piezo actuator. The distance between the different exposed lines is usually referred to as "hatching" in the case of the x–y plane and as "slicing" for the z axis. In one application, the method uses a 0.3 µm slicing distance, a 0.2 µm hatching distance, a scan speed of 10 mm/s, and a laser power of 13.5 mW. Under these settings, the total fabrication time of the complete structure, which was about 210 µm long, printed on the face of a traditional fiber is around 25 min.

Following the completion of the 3D printing in step 202, the structures are developed in step 204 in the mr-Dev 600 developer. To ensure the complete development of the very high aspect ratio hollow channels of the PCF-like waveguides, e.g., 140 µm long and 0.7 µm in diameter in the case of a dual-core DC PCF segment, a multi-step strategy may be implemented. For example, the process applies in step 204 a 5 min development step to remove the bulk of the unpolymerized photoresist. Then, still in step 204, two 20 min development steps are applied to remove any remaining unpolymerized photoresist from the hollow channels. Next, in step 206, the printed segment is immersed in isopropanol for 25 min to remove any remaining developer, and the sample is then allowed to air-dry. After the fabrication, fluorescence confocal laser scanning microscopy was used to assess if the hollow channels were completely developed. The structures can be fabricated either on glass slides using a standard substrate holder, or directly on the end-face of single-mode optical fibers. In one application, to guarantee optical fiber alignment and stability during the 3D printing, the inventors inserted the fiber in a ferrule, and then terminated and connectorized the fiber. Using this approach, the fiber is more stable compared to using a v-groove-based fiber holder.

Figure 3:
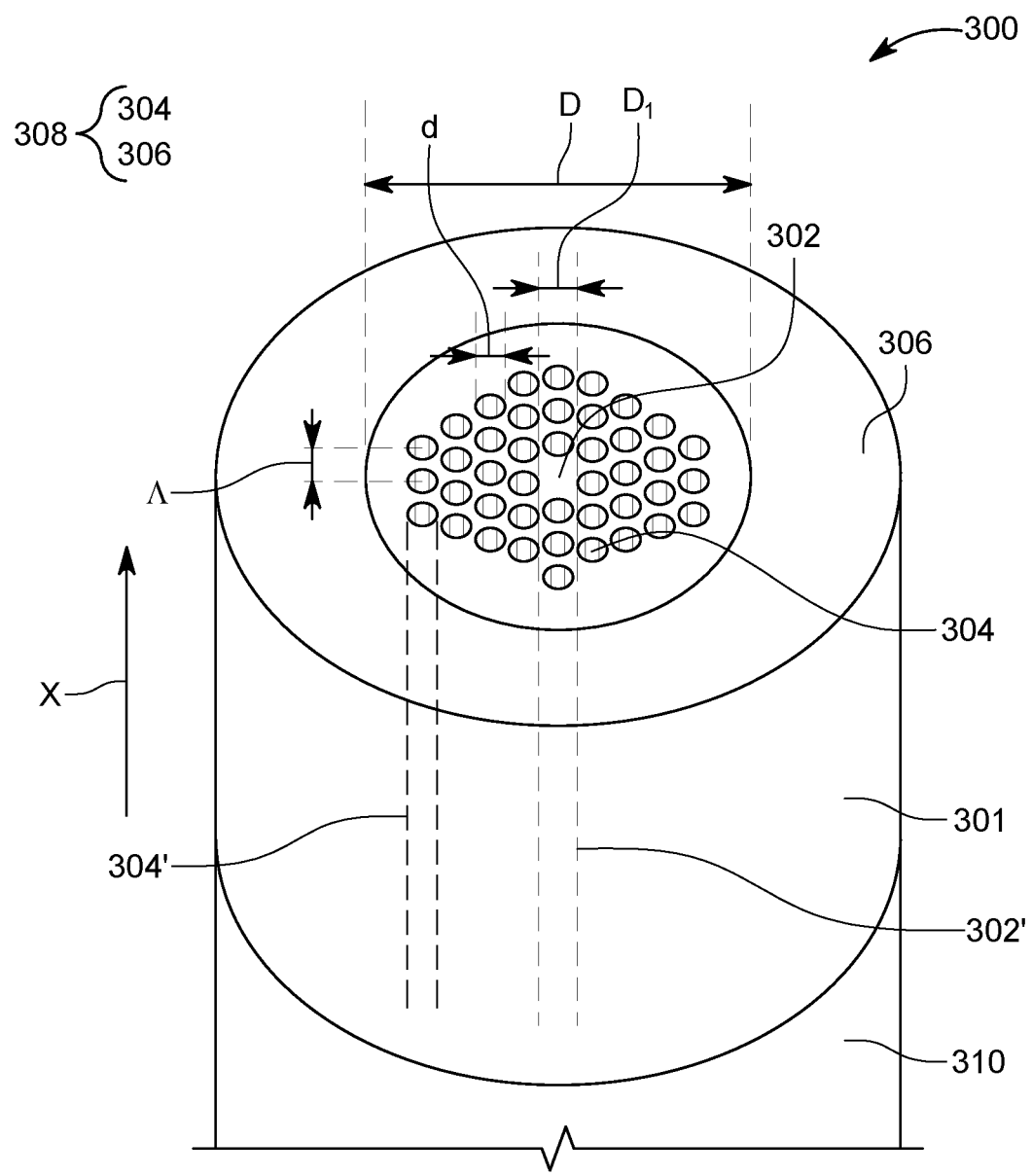
FIG. 3 illustrates a printed optical waveguide having a solid core surrounded by plural parallel channels.

Based on this method, various segments were fabricated as now discussed with regard to FIGS. 3 to 7. Scanning electron microscope (SEM) images and the optical guidance of 3D printed PCF-like segments with various solid or hollow-core geometries were obtained to determine the accuracy and flexibility of the proposed method. To prove the potency of this method, an assortment of known PCF designs were manufactured, where these designs are based on radically different guiding mechanisms, core shapes, and sizes. In this regard, FIG. 3 shows a 3D printed segment 300 having a highly nonlinear (HNL) structure [6], with a core 302 diameter D1 of 2 µm, an air-filling fraction, which is defined as the ratio of the air hole diameter d to the lattice spacing $\Delta$, equal to 0.75, and a mode field diameter (MFD) of 1.8 µm. Note that the core 302 is a solid material while plural holes 304 are made in the body 301 of the segment, around the solid core 302, and the plural holes 304 act as the cladding. The cladding also has a portion 306 of a solid material, which is the same material as the core 302. Thus, the PCF segment 300 is made of a single material, in which plural holes/channels 304 are made by 3D printing. For the HNL PCF segment 300, the entire core 302' and the channels 304' corresponding to the holes 304 (as shown in the bottom of the figure) extend along straight lines parallel to each other. Only one full channel 304' is shown in the figure for simplicity, but one skilled in the art would understand that all the channels extend along straight lines and are parallel to the core 302'. Note that a cross-section of each channel 304' is hexagonal (only one shown for simplicity) in this embodiment. This type of HNL PCF is characterized by a small core (few µm in diameter), with hexagonal holes 302 and a high air-filling fraction. The light guiding mechanism in the core 302 in the HNL PCF 300 is based on the modified total internal reflection (MTIR), which is analogous to that of a standard single-mode fiber, whereby the pattern of holes 304 surrounding the central core 302 acts as an effective cladding 308 with a reduced refractive index. For this embodiment, the HNL PCF segment 300 was directly printed on the end-face of a single-mode fiber 310 with a 6 µm MFD. The large modal mismatch between the optical fiber 310 and the 3D printed segment 300 was compensated for by including a 70-µm-long PCF-like adiabatic taper (not shown) in the 3D printed structure, similar to that described in [7], which resulted in a 1.7 dB insertion loss.

Figure 4:
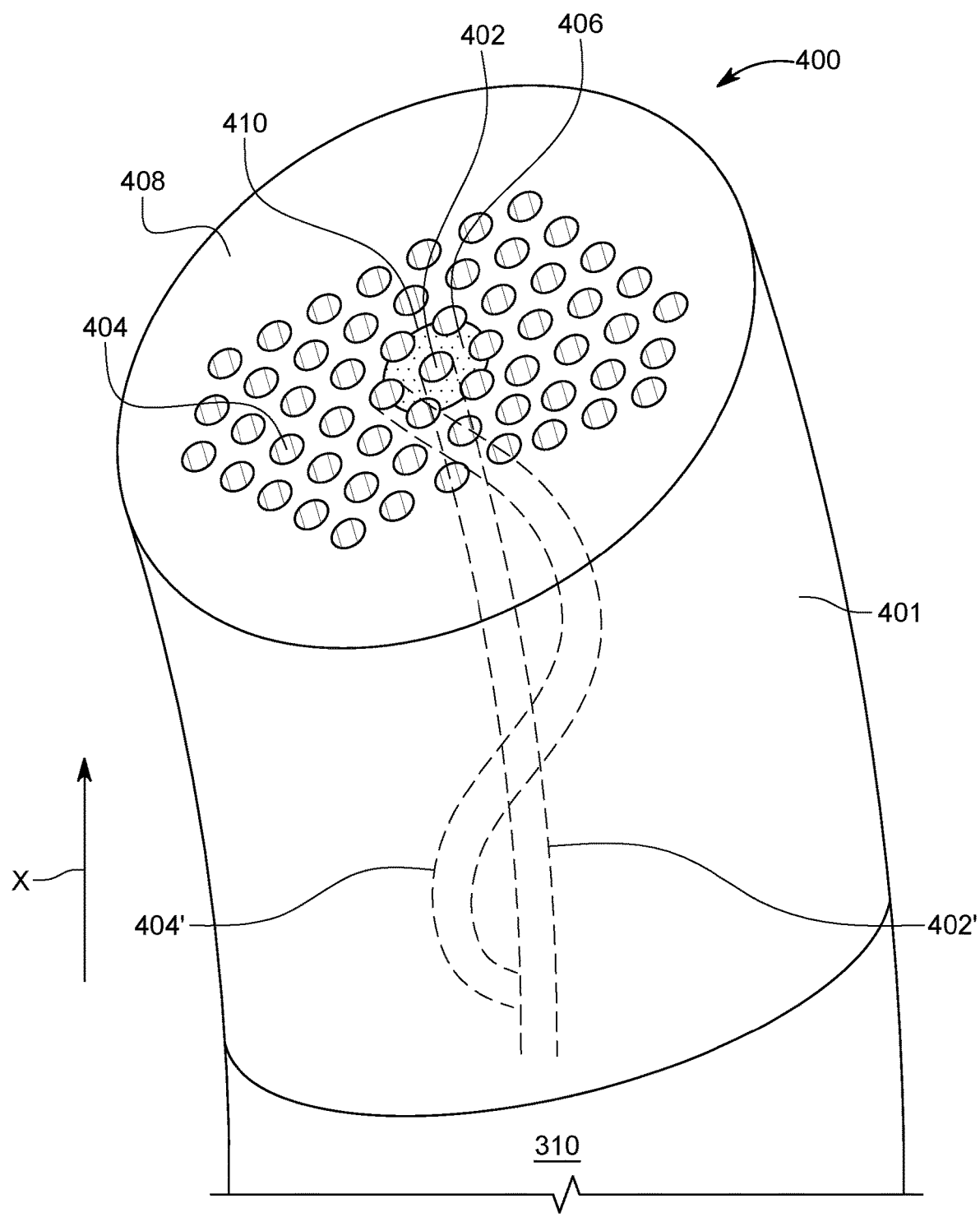
FIG. 4 illustrates a printed optical waveguide having an empty core surrounded by twisted plural channels.

FIG. 4 shows a 3D printed, helically twisted, core-less PCF segment 400 with the same geometrical pattern proposed by [8]. More specifically, a central hole 402 is present instead of the solid core in FIG. 3 and this hole continues with a channel 402'. The channel 402' extends through the body 401 of the PCF segment 400 along a straight line, parallel to the longitudinal axis X of the body. The surrounding holes 404, which act as the cladding, i.e., they confine the light moving along the channel 402' due to their geometry, are symmetrically distributed around the central hole 402, in a pattern or lattice similar to the segment 300 above. However, different from the segment 300, the corresponding channels 404' are not extending along straight lines, but rather they twist (rotate) around the channel 402', having a helical path. The twist of the channels 404' around the central channel 402' induces confinement of the light, within the central hole 402, which is not twisted. FIG. 4 indicates a region 406 made of the material that forms the body 401, in which the light is confined. Note that the light is guided within and around the central channel 402', within a cylinder defined by the first set 410 of twisted channels 404'. Increasing the twist rate for the channels 404' makes the guided mode more confined and less sensitive to perturbations. Due to the high resolution offered by the 3D printing method, it is possible to achieve a very high twist rate of $10\pi$ [rad/mm], corresponding to a twist period of 200 µm, which is higher than any twist rate previously reported in the literature. As expected for this type of PCF design, a well-defined hollow mode confined to the first ring 410 around the central non-twisted hole 402 was obtained, with an MFD of 6.57 µm. The body 401 also includes a solid cladding portion 408, i.e., a portion of the material that has no holes or channels. The solid cladding portion 408 is formed around the holes 404 and has a circular circumference. Note that while FIG. 4 shows the entire body 401 being made of a single material, it is possible in another embodiment to use materials with different indices of refraction.

Figure 2:
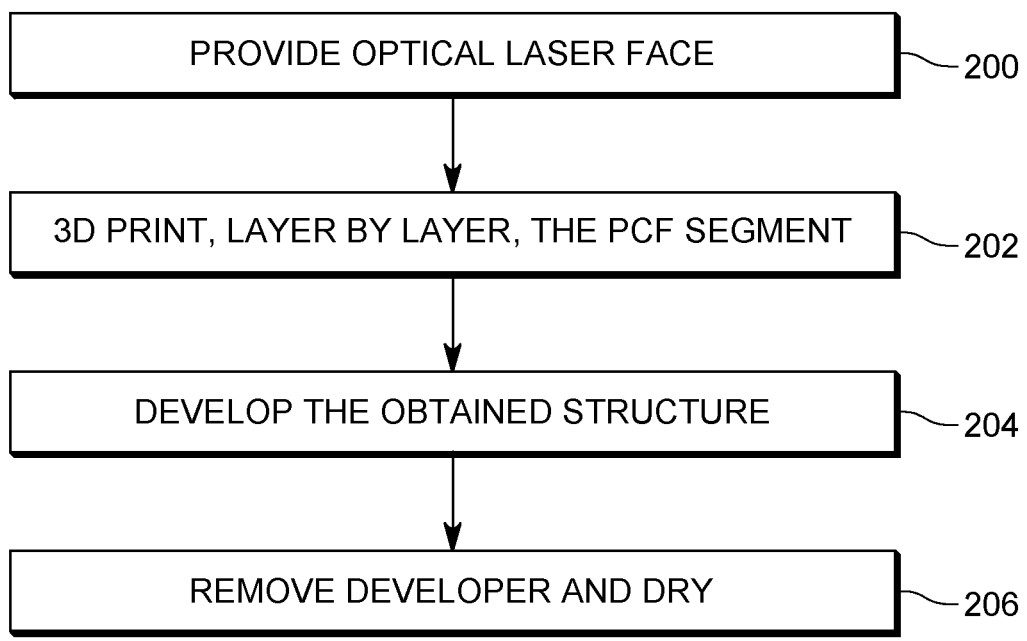
FIG. 2 is a flow chart of a method for forming an optical waveguide based on photonic crystal fibers.
Figure 5:
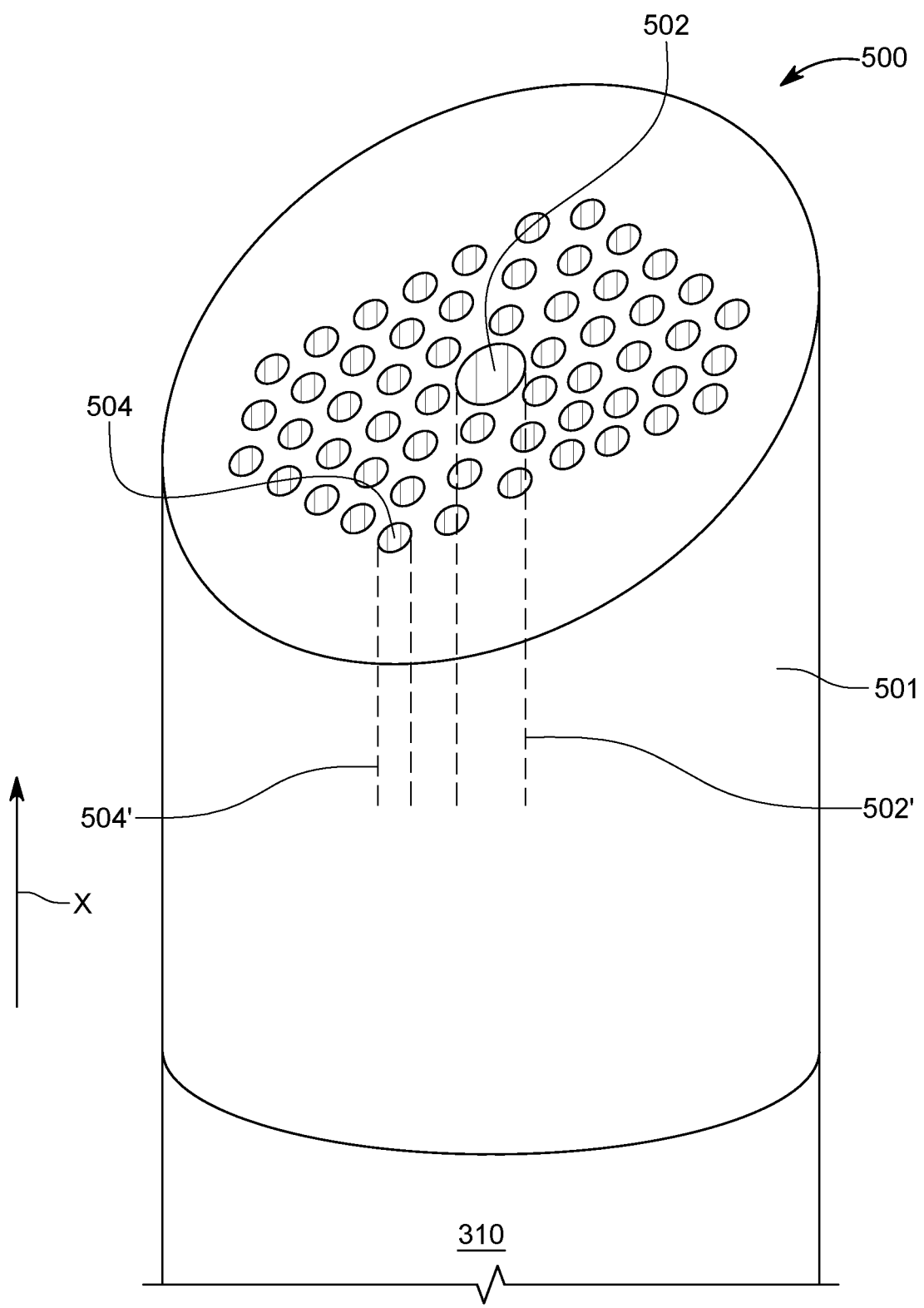
FIG. 5 illustrates a printed optical waveguide having an empty core surrounded by plural parallel channels that uses a photonic bandgap hollow-core.

Next, the 3D printing method illustrated in FIG. 2 was used to fabricate a hollow-core PCF-like segment 500, as shown in FIG. 5. The segment 500 is based on a photonic bandgap (PBG) hollow-core fibers while the next embodiment to be discussed is based on hollow-core anti-resonant fibers (HC-ARFs) [9]. In PBG hollow-core fibers, the optical confinement is provided by the PBG mechanism, in which the periodic array of holes in the cladding acts as a photonic crystal that prohibits the propagation of light, which is then trapped in the hollow core. The PBG PCF-like segment 500 is shown in FIG. 5 having a central hole 502, which corresponds to a central channel 502', and an array of holes 504, which correspond to plural channels 504'. The light propagates through the empty central channel 502' and is confined by the plural channels 504'. In this embodiment, the body 501 is formed of a single material and the plural channels 504' extend parallel to the longitudinal axis X, similar to the central channel 502'. The segment 500 in this embodiment has a geometry similar to a commercially available fiber (HC-1060-02, NTK Photonics), and the final structure was found to show the expected light guidance in the central hole, with an MFD of 8.2 µm.

Figure 6:
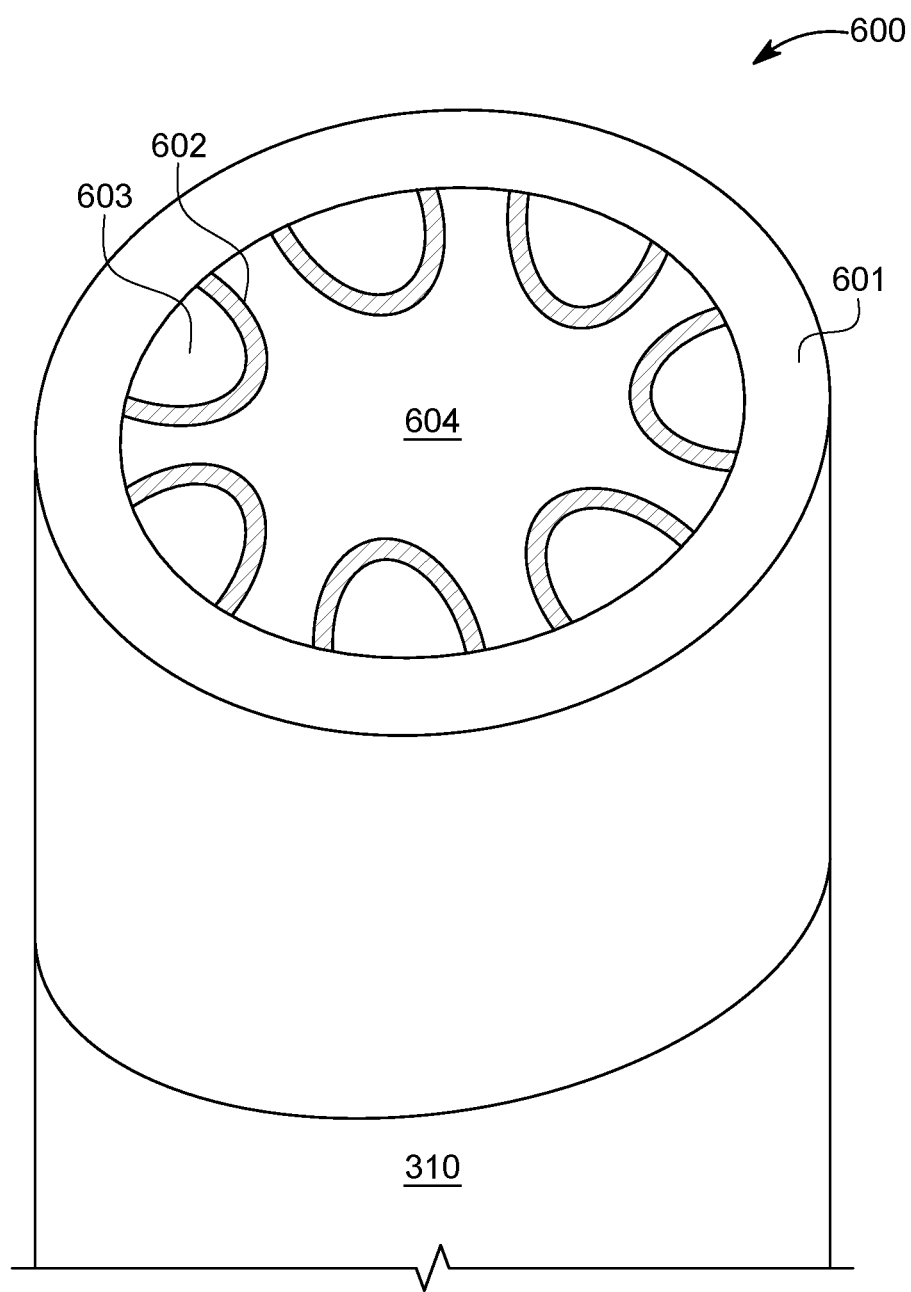
FIG. 6 illustrates a printed optical waveguide having an empty core surrounded by semi-elliptical channels.

In HC-ARFs, the light is confined through a combination of inhibited coupling between the core and the cladding modes and anti-resonant reflection at the air-fiber-material interfaces. The hollow-core region is defined by anti-resonant elements with a negative curvature. The 3D printed HC-ARF element 600, which is illustrated in FIG. 6, replicates a more recent design [10], where the anti-resonant elements 602 are semi-elliptical. Semi-elliptical elements are typically problematic to manufacture using traditional preform drawing-based methods. However, in this embodiment, the semi-elliptical structures 602 can be easily and accurately reproduced by 3D printing. FIG. 6 shows the semi-elliptical wings 602 extending from a cylindrical body 601, and defining the coreless region 604, in which the light is confined. Note that each of the semi-elliptical wings 602 has an empty region/channel 603. The light guidance in the central hollow core 604 was found to have an MFD of 12.1 µm. Note that hollow-core PBG and HC-ARF segments rely on guiding mechanisms that are very sensitive to the geometric precision of these structures. The optical guidance achieved by the segments 500 and 600 discussed above intrinsically demonstrates that the 3D printed PCF structures are geometrically accurate.

Figure 7:
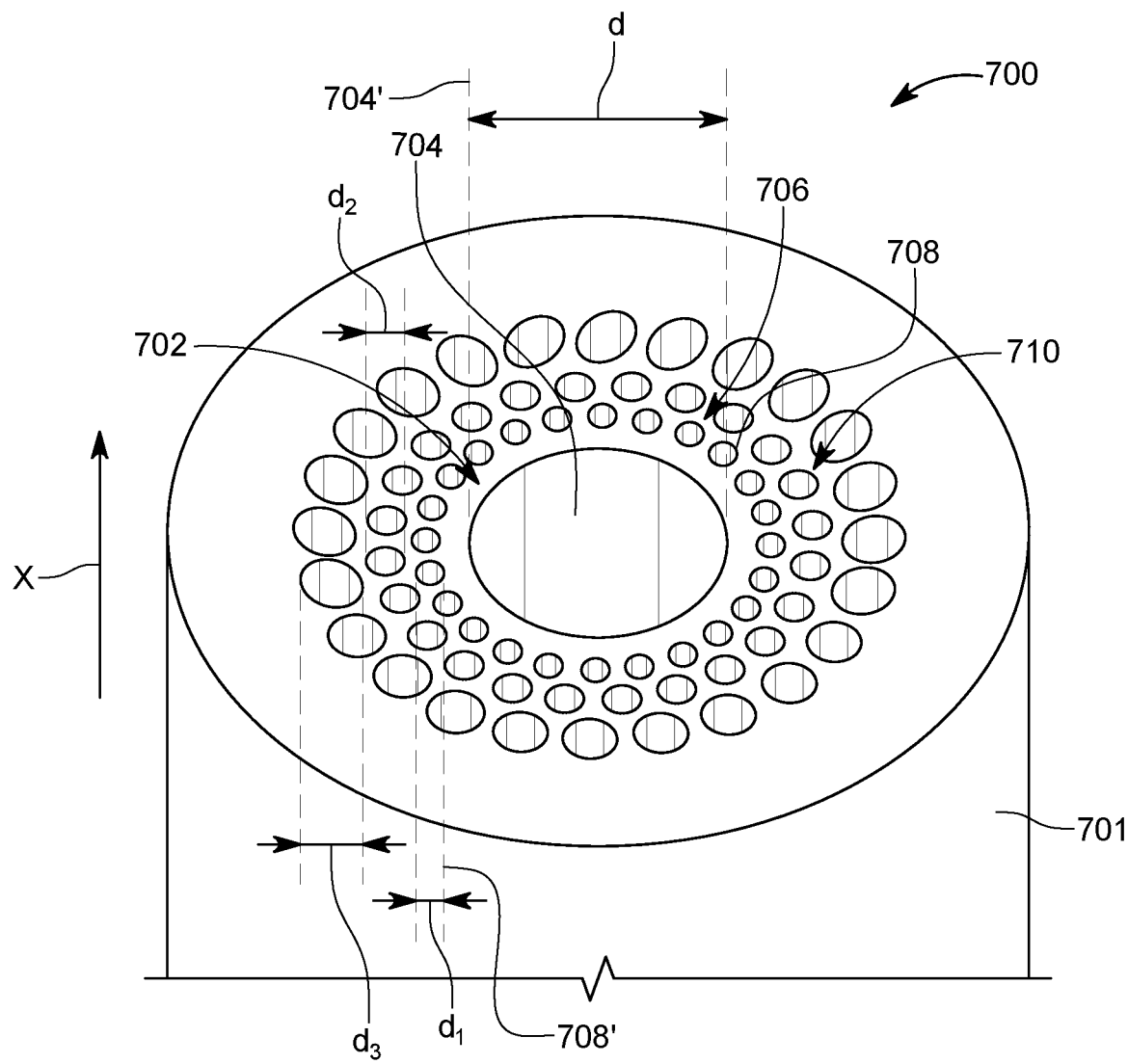
FIG. 7 illustrates a printed optical waveguide having an empty core surrounded by fractal plural channels.

Another PCF segment is shown in FIG. 7, and this segment 700 shows a solid ring-core 702, surrounded by a fractal-like pattern of holes, which supports a well-defined annular mode through an MTIR guidance mechanism. The solid core 702 is bordered by a central hole 704 having a diameter d, and a first ring 706 of plural holes 708. The first ring 706 is surrounded by a second ring 710 of holes. Further rings may be present. The core 702 has an annulus shape and is formed of the same material as the body 701. A diameter d1 of the holes of the first ring 706 is mathematically related to a diameter d2 of the holes of the second ring, and the diameter of the holes of the second ring is mathematically related to a diameter of the holes of the third ring, and so on. In one application the mathematical relation is an arithmetic relation. In another application, the mathematical relation is a geometric relation. For example, the diameter d1 of the holes of the first ring is half of the diameter d2 of the holes of the second ring, which encircles the first ring. The channels 704', 708' extend along straight lines, parallel to the longitudinal axis X. These types of structures are attractive because they have been recently shown to support modes that carry an orbital angular momentum.

The traditional PCFs manufacturing methods that use a drawing step require a final fiber cleavage step, which can eventually distort the final fiber structure or create non-flat output surfaces. Contrary to this, the 3D printing of PCF-like waveguides 300 to 700 is not affected by this issue because the 3D printing process allows direct production of flat perpendicular or angled output surfaces.

The propagation losses through the 3D printed PCF-like waveguides 300 to 700 have been measured for segments of different lengths, up to 350 µm. For a solid-core PCF design with a core size of 12 µm and $$\frac{d}{\Lambda} = 0.4,$$

the inventors found an attenuation of 0.44 dB/mm at 1070 nm and of 0.79 dB/mm at 1550 nm. For comparison, a pure silica fiber with the same PCF geometry (e.g., ESM 12B, Thorlabs) has an attenuation of about 8 dB/km. The propagation losses of the 3D printed PCF segment closely match the extinction coefficient for the bulk polymerized photoresists that are 0.43 dB/mm at 1070 nm and 0.78 dB/mm at 1550 nm, which is thus the dominant loss contribution. For the 3D printed waveguide with a PBG hollow-core PCF design illustrated in FIG. 5, the inventors found an attenuation of 0.3 dB/mm at 1070 nm. This attenuation, while being lower than the intrinsic photopolymerized material losses, is not as low as expected for propagation in a hollow core. This could be explained with the fact that a dominant factor in hollow-core PCF losses is the surface roughness of the core wall. While pure silica hollow-core PCFs have typically a sub-nanometer root mean square (RMS) roughness value, in this case the 3D printing layer-by-layer fabrication introduced a larger RMS roughness of about 30 nm (estimated from SEM images and discussed later with reference to FIG. 9E). This roughness value is consistent to what was measured by other groups using the same 3D printing technology and material.

Figure 8:
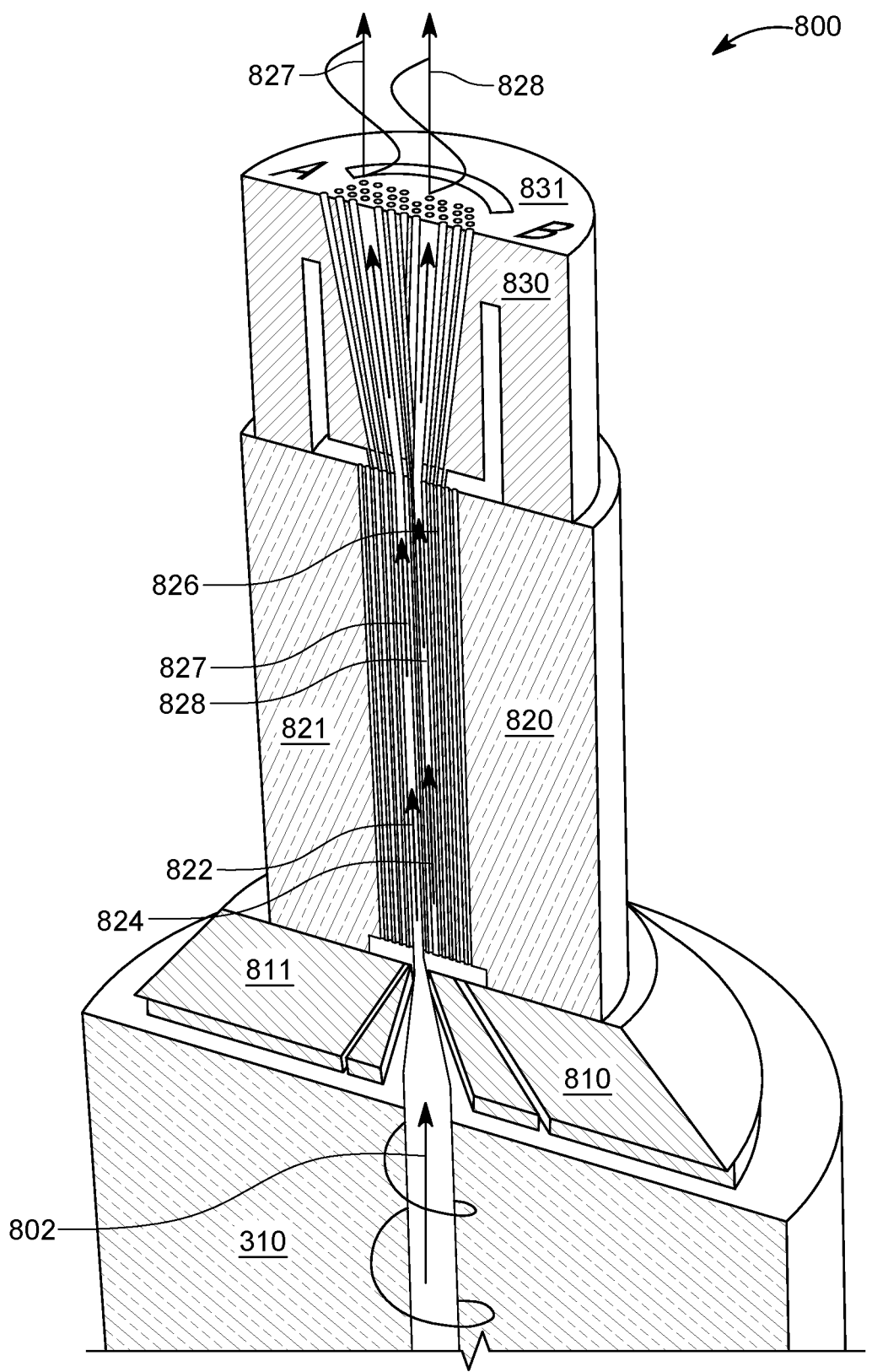
FIG. 8 illustrates a printed polarization beam splitter.
Figure 9A:
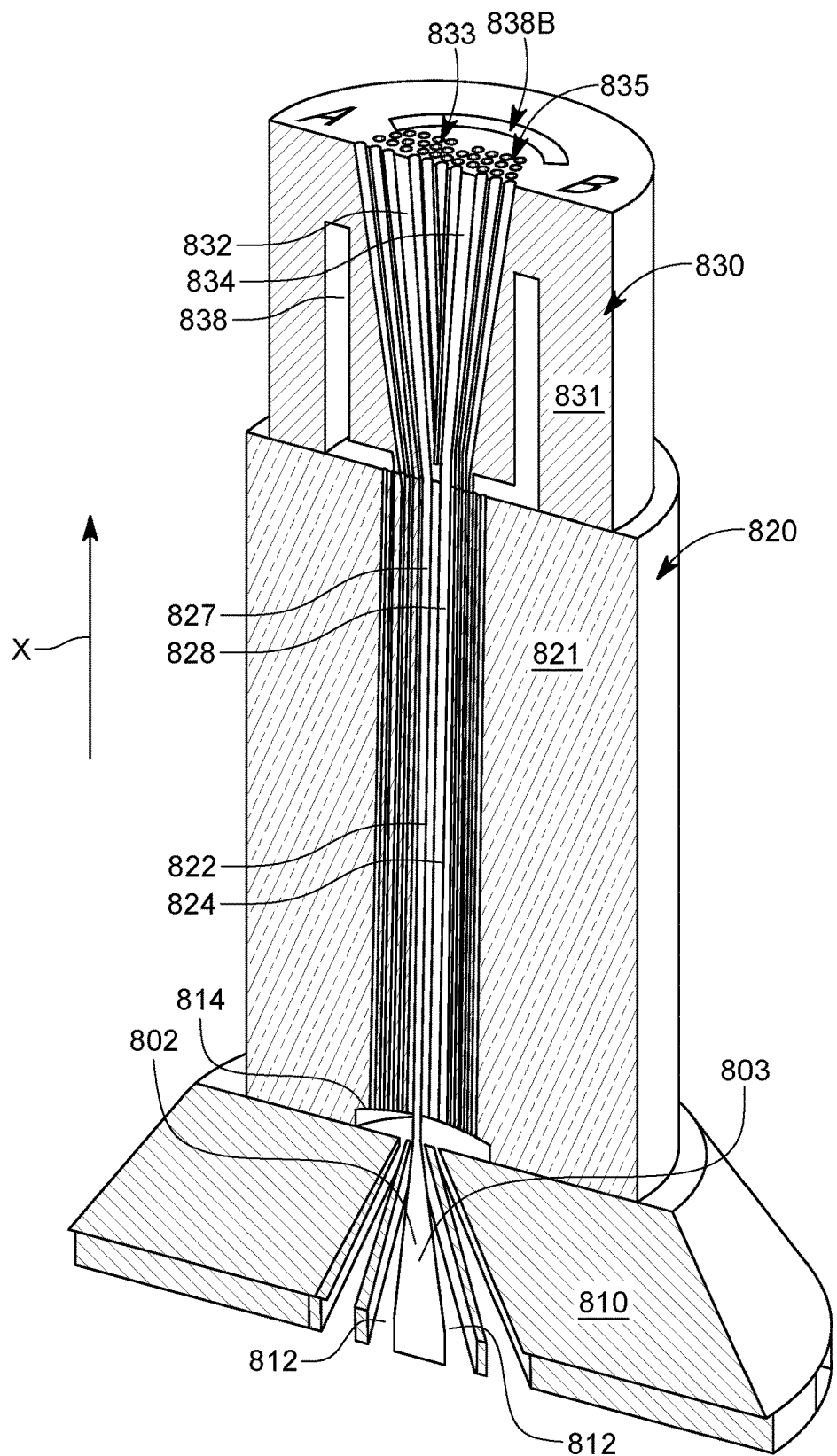
FIGS. 9A to 9D show various views of the printed polarization beam splitter of FIG. 8
Figure 9B:
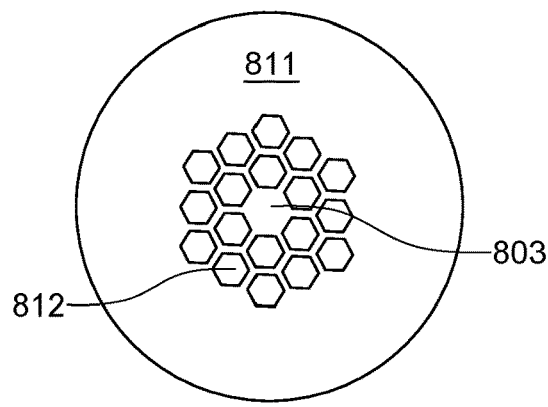
Figure 9C:
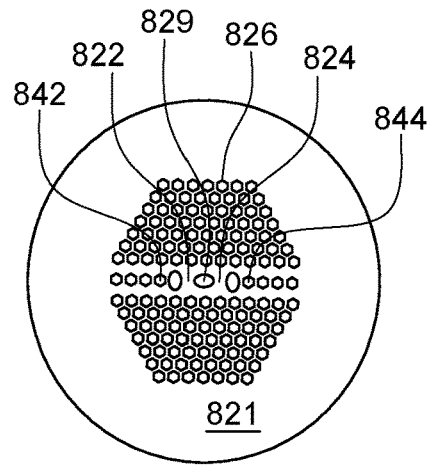
Figure 9D:
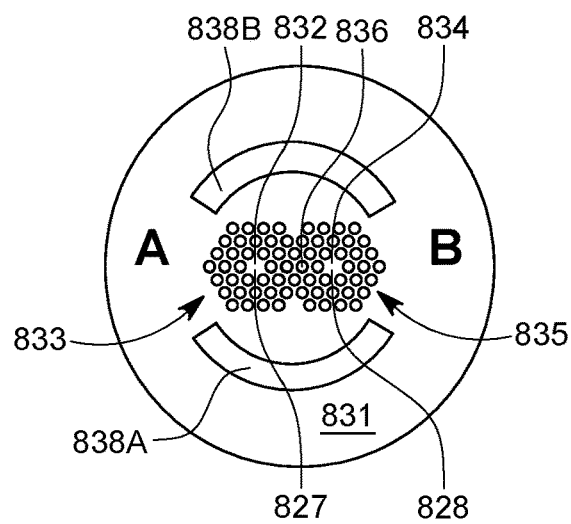
Figure 9E:
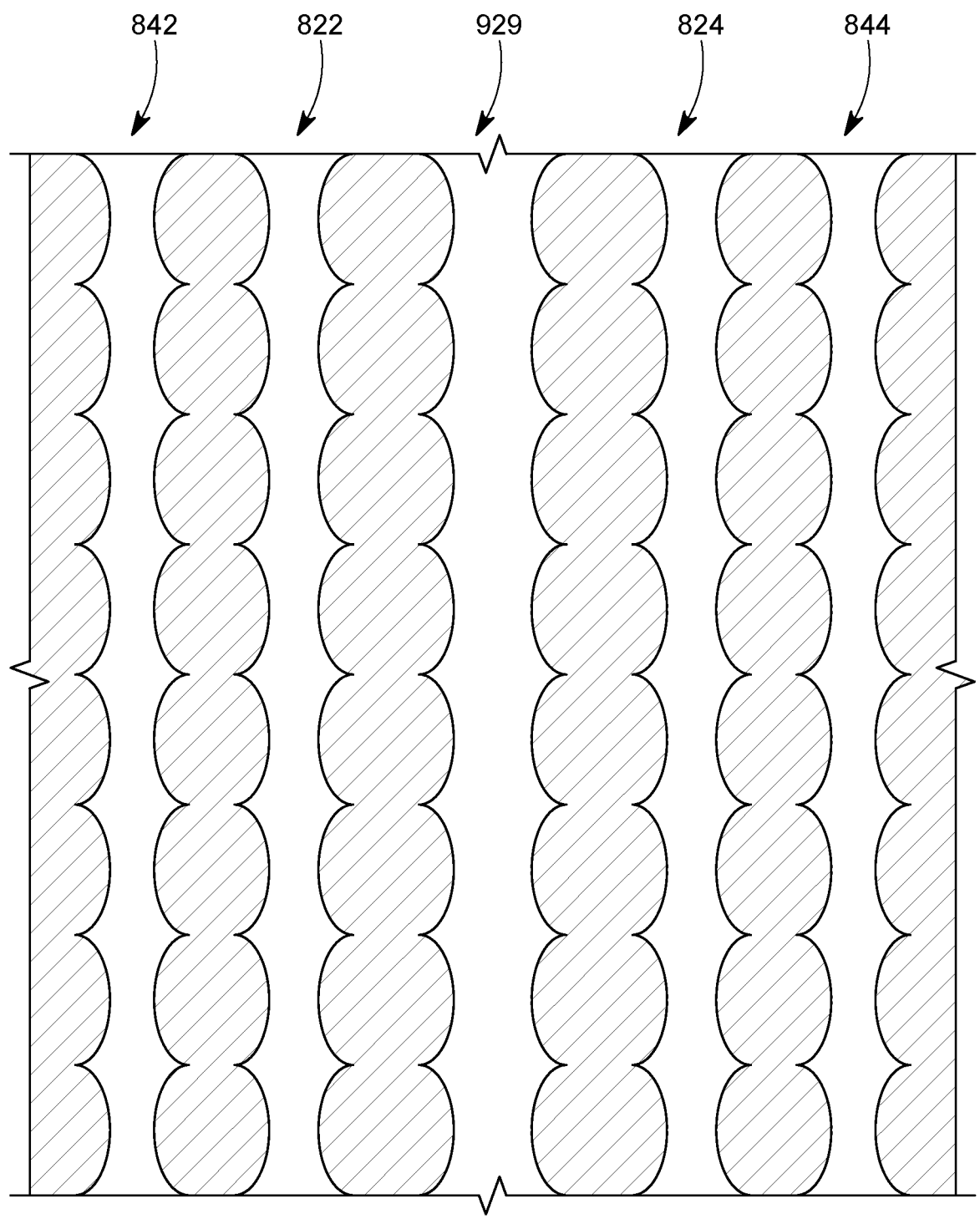
FIG. 9E shows the surface roughness of the various channels of the splitter due to the printing process.

Based on the 3D printing method discussed above, an all-fiber integrated PCF polarization beam splitter (PBS) is now discussed with regard to FIGS. 8 to 9E. With an appropriate configuration [11], the PCFs can have high birefringence, and this has been used in the past to create fiber polarizers based on single-core highly birefringent PCFs. In this embodiment, an on-fiber ultrashort PBS based on a dual-core PCF configuration is introduced, which demonstrates the multiple strengths of the 3D printing approach. Several sub-mm dual-core PCF PBS designs have been proposed over recent years; however, the limitations of current PCF fabrication methods have prevented their successful manufacture. Indeed, the dual-core geometries that have been proposed in the literature to date have all been generally asymmetric, with the inclusion of holes of different sizes and shapes, all factors that add significant complexity to the design of the preform. Moreover, these PCF PBS designs have a sub-mm length that requires a precise control to a sub-µm level to create the desired output polarization split. These combined factors make it difficult to handle and cut segments to the required length from a long fiber that has been drawn. Furthermore, on-fiber integration of the PCF PBS requires rigid coupling to a standard fiber, e.g., by fusion splicing. This coupling also requires a small but critical lateral offset of a few micrometers in order to directly couple just one of the two cores of the dual-core structure. This integration step is also significantly challenging with the traditional PCFs manufactured by fiber drawing.

FIG. 8 shows the configuration for a dual-core PCF PBS structure 800 (also called an optical waveguide), the principle of which was theoretically suggested by [12]. The PCF PBS structure 800 is implemented here using the 3D printing technique discussed above. This configuration features a very large bandwidth that includes the telecommunication C-band and an ultrashort length. Note that the ultrashort length is achieved due to the ultrahigh birefringence enabled by the PCF design. The PCF PBS structure 800 is shown in FIG. 8 being formed on a single-mode optical fiber 310 and includes a down-taper element 810, a dual-core directional coupler 820, and a core fan-out element 830. The dual-core PCF element 820 acts as a directional coupler (DC), and is characterized by a coupling length (CL) for each polarization, which is defined as the waveguide length for which there is a complete transfer of power from one core to the other. In particular, the CLs are given by:

$$CL_i = \frac{\lambda}{2 \cdot (n_i^e - n_i^o)}, \qquad (1)$$

where $\lambda$ is the wavelength of the light beam, $n_i^e$, and $n_i^o$ are the effective indices for the even and odd mode of the dual-core waveguide, respectively, and i=x, y is either of the two orthogonal polarizations of the light beam. Because of the birefringence introduced by this PCF configuration, the two CLs are different, which allows the structure 800 to act as a PBS for a proper tuning of its design parameters and at specific lengths. It is noted that the length of the dual-core DC PCF element 820 must be simultaneously (1) an odd integer multiple of the CL for one polarization and (2) an even integer multiple of the CL for the other polarization (wherein one of the polarizations is horizontal and the other one is vertical). The shortest possible polarization splitting dual-core DC is obtained when the length of the structure is equal to the CL for one polarization and twice the CL for the other polarization, thus giving a CL ratio (CLR) of 2.

Efficient integration of the dual-core DC PCF element 820 on a standard single-mode optical fiber 310 requires the addition of the additional elements 810 and 830 discussed above. By leveraging one of the strengths of the 3D printing approach, the inventors have embedded the dual-core DC PCF element 820 into a more complex photonic structure 800 composed of three sequential waveguiding segments (see FIG. 8): the PCF-like tapered coupler (down-taper) 810, the dual-core DC birefringent PCF element 820, and the fan-out segment 830, which increases the spatial separation of the two cores. The down-taper element 810 allows for efficient and alignment-free coupling of a 6 μm MFD single-mode fiber 310 to one of the two cores 822 and 824 of the birefringent dual-core DC PCF segment 820. Note that the two cores 822 and 824 are made of solid material in this case. In this regard, FIGS. 8 and 9A show how an incoming light beam 802, that is randomly polarized, is tapered to have a smaller diameter prior to entering one core 822 of the two cores 822 and 824 of the dual-core DC PCF segment 820. FIG. 9A shows that plural channels 812 are formed around a central core 803, to guide the light beam 802 and reduce its diameter. The plural channels 812 are shown in FIG. 9A being not only tilted relative to a longitudinal axis X, but also having a varying diameter, that changes from a first initial large value to a second final narrower value as the light advances along the longitudinal axis X. The plural channels 812 may be arranged in concentric circles in a body 811, around the core 803, as shown in the cross-section illustrated in FIG. 9B. Note that the core 803 is a solid material, which is made of the same material as the body 811. Also note that an external diameter of the element 810 is larger than an external diameter of the element 820. Further note that a chamber 814 is formed between the segments 810 and 820, as shown in FIG. 9A.

In one embodiment, the two cores 822 and 824 of the dual-core DC PCF segment 820 are non-circular, relatively small (1 μm along the minor axis), and positioned close to each other (e.g., 2.4 μm apart) to maximize the core intercoupling and obtain the shortest possible CLs. A cross-section thorough the dual-core DC PCF segment 820 is illustrated in FIG. 9C, which shows the two cores being non-circular. This figure also shows the two cores (solid cores) being separated by a central channel 829. Note that although only one optical beam 802 enters the dual-core DC PCF segment 820, more precisely, through the core 822, the arrangement of plural channels 826 around the cores 822 and 824 makes the light to split into two beams 827 and 828 (see FIG. 9A), where the two beams have different polarizations, e.g., horizontal and vertical polarizations, respectively. The plural channels 826 are formed in the body 821 of the dual-core DC PCF segment 820, around the two cores 822 and 824, so that the randomly polarized optical beam 802 is separated into the horizontal and vertical polarized light beams and these two beams are confined in the first and second cores, respectively. In one embodiment, the channels 826 have a specific arrangement, as shown in FIG. 9C (note that channels 842 and 844, which are adjacent to the cores 822 and 844, have a smaller diameter than the cores). In this embodiment, the channels 826 extend along the X axis from the chamber 814 up to the element 830, and they fluidly communicate with the chamber 814. Note that the same material is used in this embodiment for the body 821 of the dual-core DC PCF segment 820, the body 811 of the down-taper element 810, and the body 831 of the fan-out segment 830, and all the chambers and holes and channels are filled with ambient air. The element 820 may be printed directly on top of the element 810.

The fan-out segment 830, which is formed directly on top pf the element 820, spatially increases a distance between the two cores 822 and 824, using corresponding cores 832 and 834, up to a 10 μm distance, to facilitate optical measurements of the PBS outputs. The cores 832 and 834 are inclined relative to the longitudinal axis X with a non-zero angle. The cores 832 and 834 are solid for this segment. Each of the cores 832 and 834 is surrounded by a corresponding pattern of channels 833 and 835, respectively. In one example, each pattern is a hexagon with the solid core located in the center of the hexagon. In this embodiment, the two hexagon patterns 833 and 835 share one or more common channels 836, as illustrated in FIG. 9D. FIG. 9A shows that a chamber 838 is formed to surround the channels 833 and 835, and the chamber has one or more open slots 838A, 838B, at the top of the chamber. This segment also provides a solution for coupling to other optical fibers (not shown) or for integration into optical chip components by allowing a modal reshape of the two orthogonally polarized output beams 827 and 828. In the embodiment shown in the figures, an adiabatic transformation from an asymmetric 1×2 μm mode to a 3-μm-diameter round mode is achieved. The working spectral range for the PBS structure 800 was selected to be centered at 1550 nm, thus covering the optical communications C-band.

The channels of the various segments 810 to 830 share a same characteristic, i.e., their surface roughness is larger than the surface roughness of an equivalent segment made by drawing. In other words, if two PBS having an identical configuration are compared, one made by drawing and one made by 3D printing as described herein, the surface roughness of the channels for the 3D printed PBS structure is at least one order of magnitude, if not two, larger than the surface roughness of traditional PBS. The same is true for the elements 300 to 700. For example, the surface roughness for the traditional PBS is 1 nm or less, while the surface roughness for the PBS structure 800 is 10 nm or higher, even 30 nm. The surface roughness is quantified by the deviations in the direction of the normal vector of a real surface from its ideal form. The surface roughness of the PBS structure 800 is illustrated in FIG. 9E (figure is not at scale) and the surfaces of the various channels are exaggerated for a better visualization. Note that the same structure is true for the devices 300, 400, 500, 600 and 700. FIG. 9E also shows channels 842 and 844, which are adjacent to the cores 822 and 824, respectively.

A design of an optimal (CLR=2) dual-core DC PCF structure 800, based uniquely on the calculation of the modal effective indices, and the use of equation (1), cannot account for several aspects of the entire real-world design-to-fabrication process, such as the discretized geometry in the 3D printing system and possible anisotropic shrinkage of the structures during post-exposure development. These effects could make the fabricated PCF-like structure to slightly geometrically deviate from the desired PCF design. Additionally, it is difficult to simulate the role of the transition from the dual-core DC PCF segment 820 to the down-taper segment 810 and the fan-out segment 830. For this reason, the inventors defined the final design of the complete PCF PBS structure 800 using an iterative approach that involves modal analysis, fabrication, and optical measurements; this iterative approach was enabled by the fast turnover time achievable by the 3D printing.

The modal analysis was used to provide reliable guidelines on how the CLs change with size variations of different parts of the structure's geometry. In each step of this iterative optimization process, a different geometrical parameter of the dual-core PCF segment was selected to be varied, based on its effect on the CLs for the two orthogonal polarizations, and hence on the CLR, as indicated by the numerical calculations with modal analysis. Then, an array of different PBS structures was fabricated on a glass coverslip, where each structure had a different value for the selected geometrical parameter. The initial guess for the dual-core PCF geometry was generated from modal analysis of a geometry very similar to the one presented in [12], while accounting for the refractive index of the used photopolymer (e.g., 1.532 at 1550 nm). The structures in each array were individually coupled with a focused free-space beam, and their output sections were imaged onto an InGaAs infrared camera to extract, for each polarization, the ratio between the powers carried by the two cores.

Figure 10:
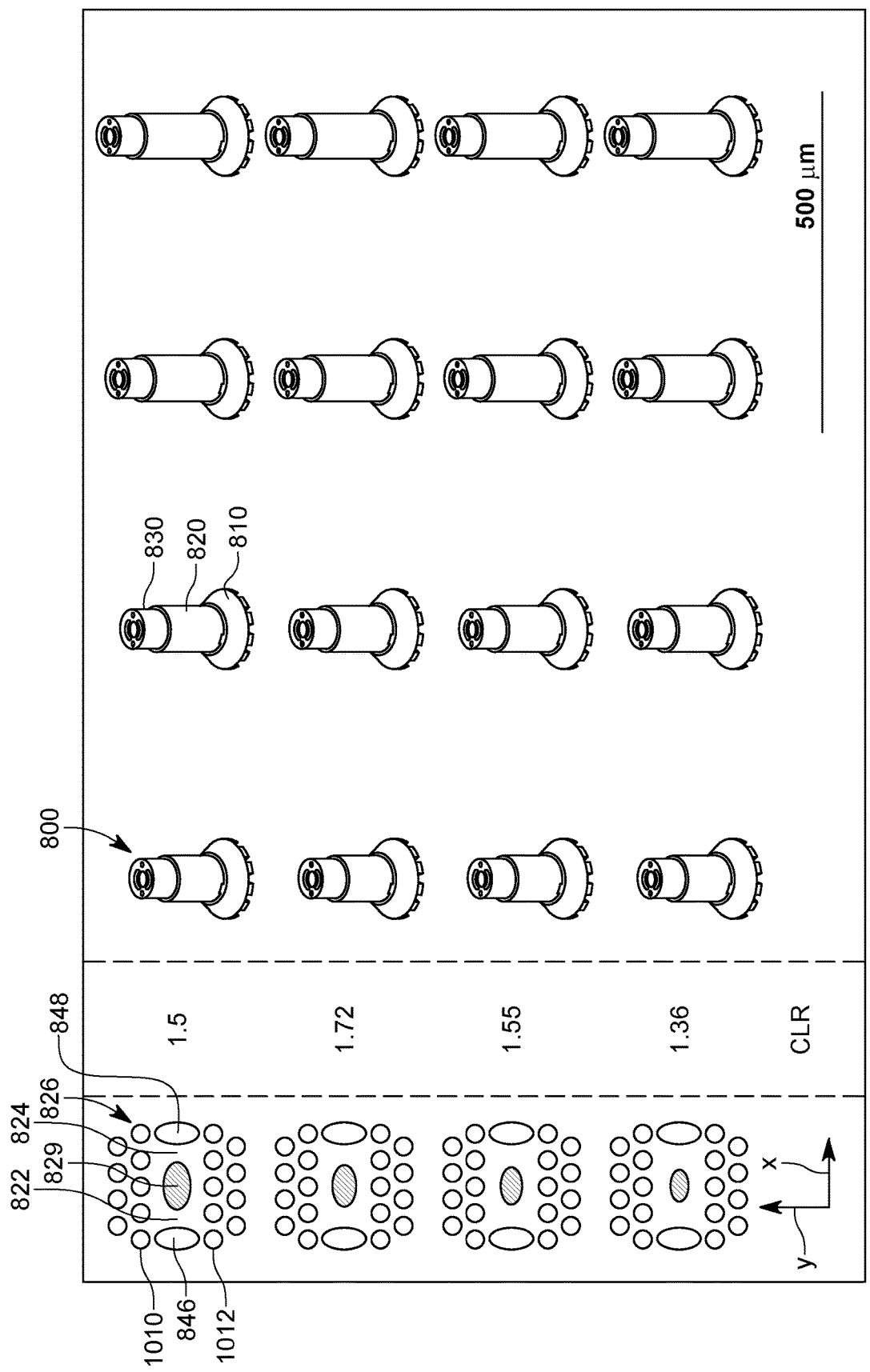
FIG. 10 illustrates how the various parameters of the printed polarization beam splitter of FIG. 8 are iteratively modified to achieve a desired geometry.

FIG. 10 shows an example of an optimization iteration method. Here, the inventors exploited the dependence of the CLR on the ellipticity of the central hole 829 in the dual-core DC PCF segment 800. Note that this figure shows the central hole 829 being surrounded by the plural channels 826. The plural channels 826 are distributed so that there is at least one row 1010 of holes above the central hole 829, and at least one row 1012 of holes below the central hole 829. Further, the core 822 is located at one side and the core 824 is located at the opposite side of the central hole 829, so that the rows 1010, 1012, and the cores 822 and 824 box-in the central hole 829, and directly influence the light propagation thorough the cores. In one application, the first and second cores 822 and 824 are approximately rectangular and the central hole 829 is elliptical, with the large axes of the cores being parallel to each other and the large axis of the central hole being perpendicular to the large axes of the first and second cores, as shown in FIG. 10. FIG. 10 further shows, consistent with FIG. 9C, that two elliptical holes 846 and 848 are boxing the two cores 822 and 824, and the two elliptical holes 846 and 848 have their large axes perpendicular to the large axis of the central hole 829.

To determine the CL for each configuration, the inventors printed an array of structures 800 with four different ellipticities (for the central hole 829), and for each ellipticity, three more structures were printed with different longitudinal lengths, increasing from left to right in FIG. 10, for a total of 16 structures in the array. By fitting the variation in the ratio of powers carried by the two cores at different lengths, it was possible to extrapolate the two CLs, hence giving the CLR for each different ellipticity. The structure with the geometry that gave a CLR closest to 2 was used as a starting point for the next round of the iteration process, where a different geometrical parameter was changed. In one application, the parameters adjusted during these iterations where: (1) the positions of the three holes (belonging to the row 1010) directly above the central hole 829, (2) the positions of the three holes (belonging to the row 1012) directly below the central hole 829, (3) the ellipticity of the central hole 829, that separates the two cores 822 and 824, and (4) the diameters of the 10 holes closest to the cores.

Figure 11A:
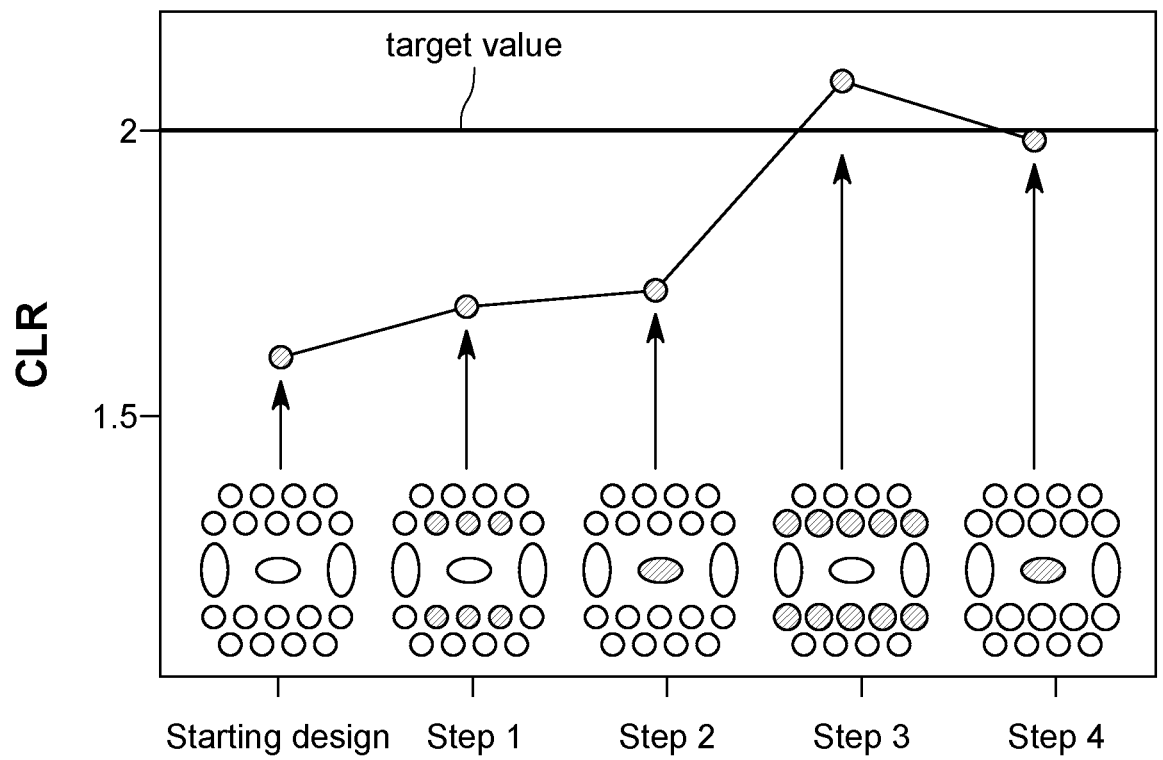
FIG. 11A shows four different iterations for determining the size of the various channels and cores of the printed polarization beam splitter and FIG. 11B shows the final structure of this device.
Figure 11B:
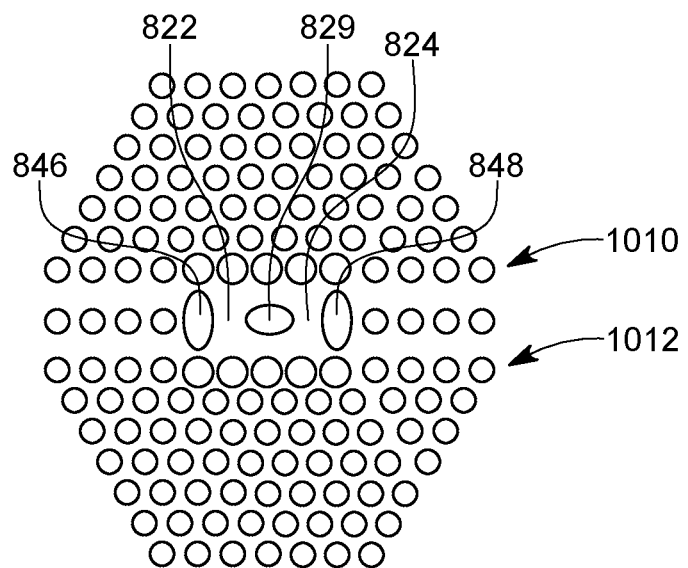

From the new fabricated array, a new geometry of the PBS 800 is found, which achieves a CLR even closer to 2. The complete optimization process involved four steps in this embodiment (more or less steps may be used, depending on the number of parameters that are calculated) and the variation of three geometrical parameters, as illustrated in FIG. 11A, concluding with the optimized design shown in FIG. 11B, which gave a satisfactory CLR of 1.97. The optimized design has a 140-μm-long dual-core DC PCF segment 820 and the entire PBS has a length of 210 μm. Each step in FIG. 11A optimizes a different parameter.

Figure 12:
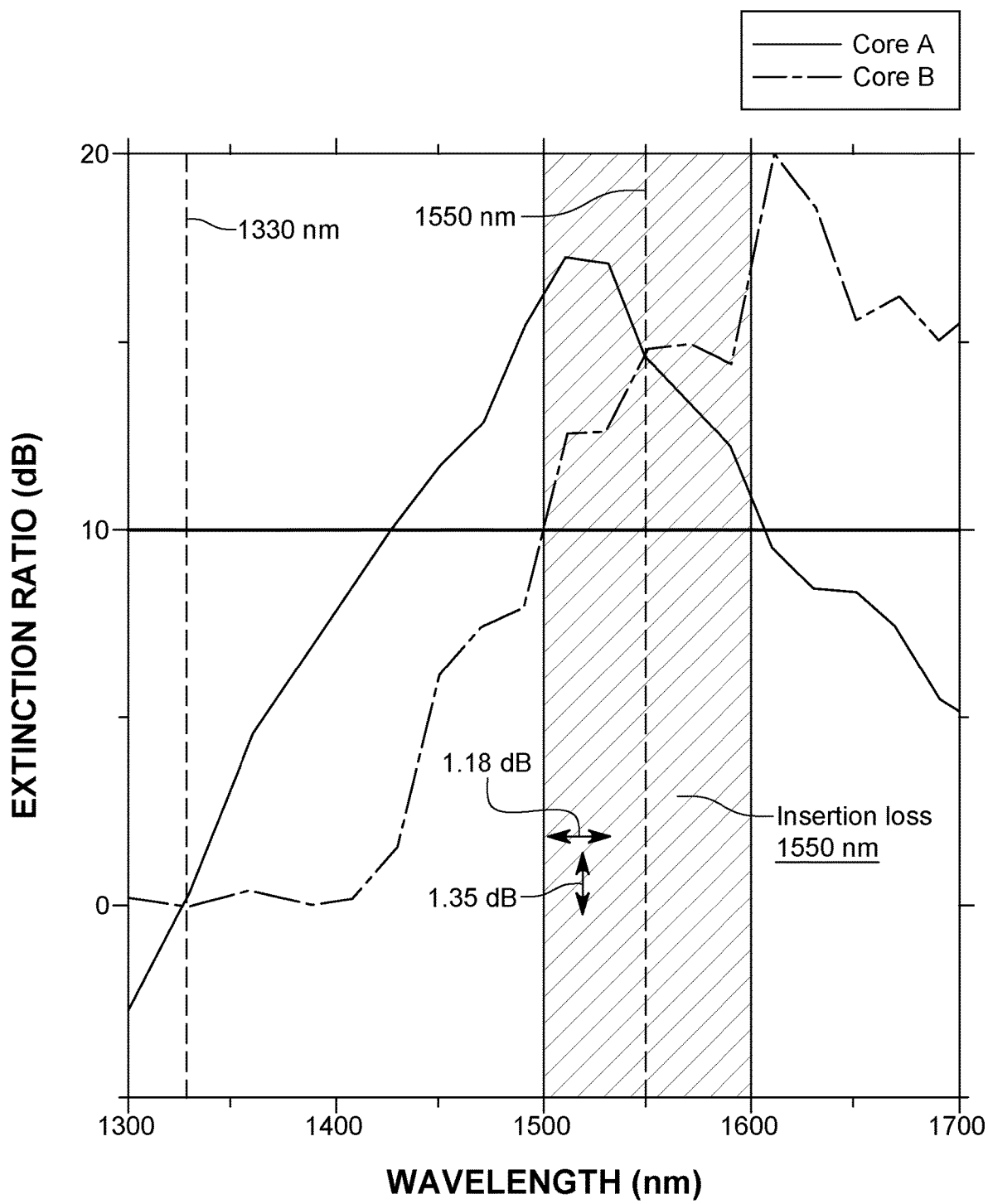
FIG. 12 illustrates the extinction ratios on the two cores of the printed polarization beam splitter, which simultaneously exceed 10 dB on a 100 nm bandwidth centered at around 1550 nm.
Figure 13:
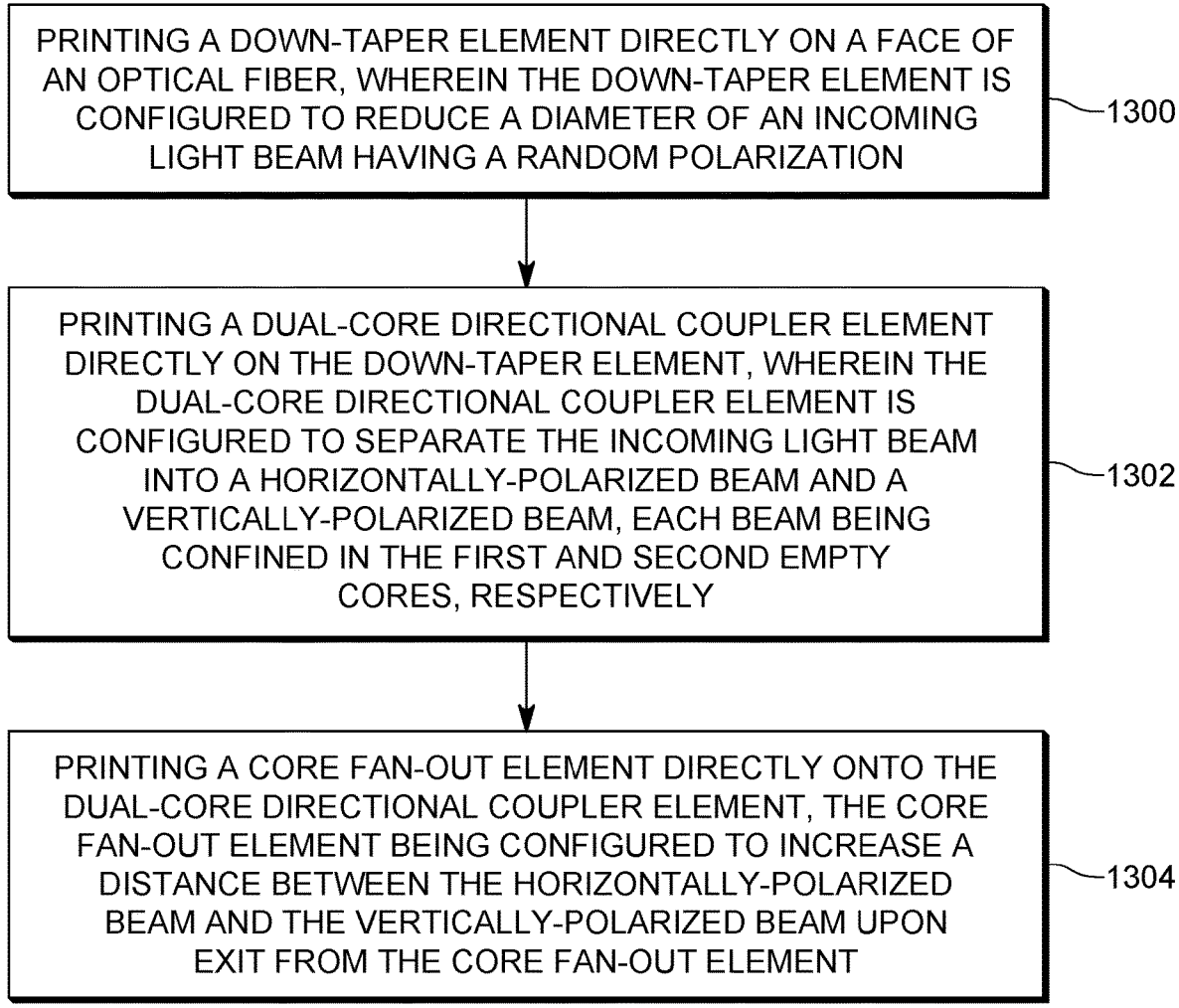
FIG. 13 is a flow chart of a method for printing the polarization beam splitter of FIG. 8.

The finalized PCF PBS structure 800 was directly printed on the end-face of a single-mode fiber 310. This PCF PBS structure 800, which is 3D printed on the fiber 310, was found to have an extinction ratio of more than 10 dB over a bandwidth of 100 nm and centered around 1550 nm, as shown in FIG. 12. Both cores had an extinction ratio above 12.6 dB in the fiber optics communication C-band (1530-1565 nm). At 1550 nm, the PBS structure 800 achieved a minimum extinction ratio of 14.37 dB. The insertion loss at 1550 nm was 1.18 dB for the horizontal polarization and 1.35 dB for the vertical polarization. These insertion losses could be further improved by using a longer down-taper section, to make it adiabatic according to the length-scale criterion. The bandwidth of the PCF PBS structure 800 was very broad (i.e., 150 nm at 10 dB extinction ratio).

The above embodiments demonstrate the successful direct 3D printing and optical guidance of a selection of optical waveguides with PCF-like designs that rely on different guiding mechanisms. By successfully fabricating these PCF designs, the 3D printing method has been proven to achieve the fabrication precision and optical quality required for obtaining the final desired cross-sectional PCF geometry considerably faster than current PCF fabrication methods. It was also demonstrated that this method is capable of fabricating PCF-like waveguides with geometries that were previously impossible to manufacture because of their complexity. Specifically, this method succeeded in fabricating the first-ever PCF PBS structure 800. This PCF PBS is the first example of miniaturized complex structure made of stacked segments with PCF designs, presenting fast longitudinal tapers and precisely controlled lateral offsets. Through the realization of the PCF PBS structure 800, it was showed how direct 3D printing of PCF-like waveguides allows for a comprehensive optimization process that is significantly faster than current PCF fabrication methods based on the drawing of a preform.

Besides demonstrating the strengths of this novel approach, fabricating the PCF PBS structure 800 is significant in itself, as miniaturization and fiber integration of polarization splitting devices are highly desirable features, especially in optical communication systems. Polarizing beam splitters 3D printed on optical fibers have been already reported in the literature [13,14]; however, they are based on diffraction mechanisms, and a further integration of such systems in a fiber optical system could be complicated by their intrinsic free-space output.

Based on current high-resolution 3D printing technology, the maximum length that can be achieved for a PCF-like waveguide may be limited. However, it is expected that advances in multi-photon lithography fabrication performance will soon allow for the fabrication of longer segments and at faster speeds. 3D printing fabrication also opens up the possibility to fabricate the bulk parts of the structures that are not used in light propagation (e.g., the outer part of the waveguide cladding) as a wireframe mesh. With this approach, lighter and faster fabrication of robust structures is achievable, potentially leading to the design of unique opto-mechanical properties. Such wireframe structuring is not currently achievable with traditional drawing-based methods. The current propagation losses for 3D printed solid-core PCF-like waveguides are relatively high, and are contributed mainly by the extinction coefficient of the polymerized photoresist, which is significantly higher than that of standard fiber optic materials such as fused silica. It is expected that future improvements in multiphoton polymerizable materials will lead to more favorable propagation losses.

Additionally, an approach described recently for high-resolution 3D printing of glass-ceramics could allow the use of less lossy materials, which could also provide better mechanical and thermal properties to the printed PCF segments than what is offered by polymers. The propagation losses of 3D printed hollow-core PCF designs are also relatively high, in this case mainly because of the intrinsic roughness of longitudinal surfaces, which is 2 orders of magnitude higher than typical values for drawn glass PCFs. This roughness is determined by the chosen slicing step-size that, while allowing for a reasonable fabrication time, was nevertheless not optimal for reducing propagation losses. As fabrication speeds and methods improve in the future, smaller slicing steps will become more viable, leading to smoother surfaces and lower propagation losses. Nevertheless, even if the current propagation losses of the 3D printed waveguides based on PCF designs are a little too high for long propagation distances, they are still suitably low enough to achieve unique and well-performing miniaturized photonic devices. It is expected that this novel approach will open up new possibilities to enhance optical fiber end-faces with miniaturized hybrid complex photonic systems based on segments having PCF designs, as well as their easy combination with other 3D-printable refractive, reflective, diffractive, and metamaterial-based elements. These structures may find application in orbital angular momentum, optical tweezers, and quantum technologies. New, more sophisticated fiber-end probes for biomedical applications may also emerge. The inventors also foresee the development of novel fiber end-face sensors that use 3D printed hollow-core PCF designs for bioanalytics and optofluidics. These applications could benefit from new photoresists with low autofluorescence that are being developed. The inclusion of metals and liquids in high-resolution 3D printed structures has already been demonstrated; this technology could be combined with the novel method discussed herein to create multi-material hybrid PCF-like structures. It is also expected that optical and fiber-optic engineers could benefit from the unprecedented possibilities offered by the freedom of design of PCF geometries in several ways: (a) the easier fabrication of previously difficult-to-produce PCF geometries could unlock new designs, including not-yet-proposed designs that were hitherto considered impossible to fabricate; (b) several properties (e.g., mode shape, mode size) of special PCF designs could be experimentally tested without concern for long turnaround times to achieve the desired fiber geometries fabricated, etc.

It is also expected that this novel technology could be applied in the development of twisted optical fibers. In addition to the very high twist rates achievable, a finely controlled transverse and/or axial modulation of the twist rate, as is easily achieved by 3D printing, could lead to new optical effects. The 3D printing approach discussed herein that create optical waveguides that exploit the unique properties of PCF designs could integrate/complement other recently proposed methods that share the same printing technology, for creating and coupling optical waveguides and photonic chips.

The PBS structure 800 discussed above may be manufactured based on a method as now discussed. The method may include a step 1300 of printing a down-taper element directly on a face of an optical fiber, wherein the down-taper element is configured to reduce a diameter of an incoming light beam having a random polarization, a step 1302 of printing a dual-core directional coupler element directly on the down-taper element, wherein the dual-core directional coupler element is configured to separate the incoming light beam into a horizontally-polarized beam and a vertically-polarized beam, each beam being confined in first and second cores, respectively, and a step 1304 of printing a core fan-out element directly onto the dual-core directional coupler element, the core fan-out element being configured to increase a distance between the horizontally-polarized beam and the vertically-polarized beam upon exit from the core fan-out element. Each of the down-taper element, the dual-core directional coupler element, and the core fan-out element are 3-dimensional, 3D, printed using a single material.

A surface roughness of interior channels is larger than 10 nm due to the printing. The method may further include a step of printing a body of the dual-core directional coupler element to extend along a longitudinal axis, a step of forming first and second cores in the body, the first and second cores extending along the longitudinal axis, a step of forming a central passage in the body, between the first and second cores, the central passage extending along the longitudinal axis, and a step of forming plural passages in the body, around the first and second cores, the plural passages extending along the longitudinal axis. In one application, the first and second cores are approximately rectangular. The first core hosts the horizontally-polarized beam and the second core hosts the vertically-polarized beam.

The disclosed embodiments provide an optical waveguide that is manufactured by 3D printing, to have plural channels extending through a body of the optical waveguide. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] A. Tandjè, J. Yammine, M. Dossou, G. Bouwmans, K. Baudelle, A. Vianou, E. R. Andresen, and L. Bigot, "Ring-core photonic crystal fiber for propagation of OAM modes," Opt. Lett. 44, 1611-1614 (2019).
[2] K. Cook, J. Canning, S. Leon-Saval, Z. Reid, M. A. Hossain, J.-E. Comatti, Y. Luo, and G.-D. Peng, "Air-structured optical fiber drawn from a 3D-printed preform," Opt. Lett. 40, 3966-3969 (2015).
[3] L. D. van Putten, "Design and fabrication of novel polymer antiresonant waveguides," Ph.D. thesis (University of Southampton, 2019).
[4] W. Talataisong, R. Ismaeel, T. H. Marques, S. A. Mousavi, M. Beresna, M. Gouveia, S. R. Sandoghchi, T. Lee, C. M. Cordeiro, and G. Brambilla, "Mid-IR hollow-core microstructured fiber drawn from a 3D printed PETG preform," Sci. Rep. 8, 8113 (2018).
[5] Z. Gan, Y. Cao, R. A. Evans, and M. Gu, "Three-dimensional deep sub-diffraction optical beam lithography with 9 nm feature size," Nat. Commun. 4, 2061 (2013).
[6] S. Leon-Saval, T. Birks, W. Wadsworth, P. St. J. Russell, and M. Mason, "Supercontinuum generation in submicron fibre waveguides," Opt. Express 12, 2864-2869 (2004).
[7] A. Bertoncini, V. P. Rajamanickam, and C. Liberale, "On-fiber 3D printing of photonic crystal fiber tapers for mode field diameter conversion," in The European Conference on Lasers and Electro-Optics (Optical Society of America, 2017), paper CE_6_2.
[8] R. Beravat, G. K. L. Wong, M. H. Frosz, X. M. Xi, and P. St. J. Russell, "Twist-induced guidance in coreless photonic crystal fiber: a helical channel for light," Sci. Adv. 2, e1601421 (2016).
[9] B. Debord, F. Amrani, L. Vincetti, F. Gérôme, and F. Benabid, "Hollow-core fiber technology: the rising of 'gas photonics'," Fibers 7, 16-58 (2019).
[10] H. Kubota, S. Kawanishi, S. Koyanagi, M. Tanaka, and S. Yamaguchi, "Absolutely single polarization photonic crystal fiber," IEEE Photon. Technol. Lett. 16, 182-184 (2004).
[11] H. Jiang, E. Wang, J. Zhang, L. Hu, Q. Mao, Q. Li, and K. Xie, "Polarization splitter based on dual-core photonic crystal fiber," Opt. Express 22, 30461-30466 (2014).
[12] V. Hahn, S. Kalt, G. M. Sridharan, M. Wegener, and S. Bhattacharya, "Polarizing beam splitter integrated onto an optical fiber facet," Opt. Express 26, 33148-33157 (2018).
[13] H. Wei, F. Callewaert, W. Hadibrata, V. Velev, Z. Liu, P. Kumar, K. Aydin, and S. Krishnaswamy, "Two-photon direct laser writing of inverse-designed free-form near-infrared polarization beamsplitter," Adv. Opt. Mater. 7, 1900513 (2019).

What is claimed is:

1. An optical waveguide configured to guide an optical beam, the optical waveguide comprising:
a down-taper element configured to reduce a diameter of an incoming light beam having a random polarization;
a dual-core directional coupler element configured to separate the incoming light beam into a horizontally-polarized beam and a vertically-polarized beam, each beam being confined in first and second cores, respectively; and
a core fan-out element configured to increase a distance between the horizontally-polarized beam and the vertically-polarized beam upon exit from the core fan-out element,
wherein each of the down-taper element, the dual-core directional coupler element, and the core fan-out element are 3-dimensional, 3D, printed using a single material, and
wherein a surface roughness of interior passages formed around the first and second cores is larger than 10 nm due to the 3D printing.

2. The optical waveguide of claim 1, wherein the dual-core directional coupler comprises:
a body extending along a longitudinal axis;
first and second cores formed in the body and extending along the longitudinal axis;
a central passage formed in the body, between the first and second cores, and extending along the longitudinal axis; and
plural passages formed in the body, around the first and second cores, and extending along the longitudinal axis.

3. The optical waveguide of claim 2, wherein a cross-section of the first and second cores is approximately rectangular.

4. The optical waveguide of claim 3, wherein the first core hosts the horizontally-polarized beam and the second core hosts the vertically-polarized beam.

5. The optical waveguide of claim 4, wherein the central passage and the plural passages are distributed around the first and second cores to confine the horizontally-polarized beam exclusively into the first core and to confine the vertically-polarized beam exclusively into the second core.

6. The optical waveguide of claim 2, wherein the core fan-out element includes first and second solid cores, each surrounded by a corresponding plurality of channels, and the first core of the dual-core directional coupler element is aligned with the first solid core of the core fan-out element, and the second core of the dual-core directional coupler element is aligned with the second solid core of the core fan-out element, and the first and second cores are solid.

7. The optical waveguide of claim 1, wherein the single material includes pentaerythritol triacrylate.

8. The optical waveguide of claim 1, wherein the single material is a photoresist.

9. The optical waveguide of claim 1, wherein the down-taper element hosts only the incoming light beam inside a solid core, which is surrounded by plural channels that confine and reduce the diameter of the incoming light beam.

10. An optical waveguide configured to guide an optical beam, the optical waveguide comprising:
a down-taper element configured to reduce a diameter of an incoming light beam having a random polarization;
a dual-core directional coupler element configured to separate the incoming light beam into a horizontally-polarized beam and a vertically-polarized beam, each beam being confined in first and second cores, respectively; and
a core fan-out element configured to increase a distance between the horizontally-polarized beam and the vertically-polarized beam upon exit from the core fan-out element,
wherein each of the down-taper element, the dual-core directional coupler element, and the core fan-out element are 3-dimensional, 3D, printed using a single material, and
wherein the down-taper element hosts only the incoming light beam inside a solid core, which is surrounded by plural channels that confine and reduce the diameter of the incoming light beam.

11. The optical waveguide of claim 10, wherein a surface roughness of interior passages formed around the first and second cores is larger than 10 nm due to the 3D printing.

12. The optical waveguide of claim 10, wherein the dual-core directional coupler comprises:
a body extending along a longitudinal axis;
first and second cores formed in the body and extending along the longitudinal axis;
a central passage formed in the body, between the first and second cores, and extending along the longitudinal axis; and
plural passages formed in the body, around the first and second cores, and extending along the longitudinal axis.

13. The optical waveguide of claim 12, wherein a cross-section of the first and second cores is approximately rectangular.

14. The optical waveguide of claim 13, wherein the first core hosts the horizontally-polarized beam and the second core hosts the vertically-polarized beam.

15. The optical waveguide of claim 14, wherein the central passage and the plural passages are distributed around the first and second cores to confine the horizontally-polarized beam exclusively into the first core and to confine the vertically-polarized beam exclusively into the second core.

16. The optical waveguide of claim 12, wherein the core fan-out element includes first and second solid cores, each surrounded by a corresponding plurality of channels, and the first core of the dual-core directional coupler element is aligned with the first solid core of the core fan-out element, and the second core of the dual-core directional coupler element is aligned with the second solid core of the core fan-out element, and the first and second cores are solid.

17. The optical waveguide of claim 10, wherein the single material includes pentaerythritol triacrylate.

18. The optical waveguide of claim 10, wherein the single material is a photoresist.

19. An optical waveguide configured to guide an optical beam, the optical waveguide comprising:
a down-taper element configured to reduce a diameter of an incoming light beam having a random polarization;
a dual-core directional coupler element configured to separate the incoming light beam into a horizontally-polarized beam and a vertically-polarized beam, each beam being confined in first and second cores, respectively; and
a core fan-out element configured to increase a distance between the horizontally-polarized beam and the vertically-polarized beam upon exit from the core fan-out element,
wherein each of the down-taper element, the dual-core directional coupler element, and the core fan-out element are 3-dimensional, 3D, printed using a single material, and
wherein the dual-core directional coupler comprises:
a body extending along a longitudinal axis;
first and second cores formed in the body and extending along the longitudinal axis;
a central passage formed in the body, between the first and second cores, and extending along the longitudinal axis; and
plural passages formed in the body, around the first and second cores, and extending along the longitudinal axis.

* * * * *